United States Patent
Higashino (10) Patent No.: US 8,038,960 B2
(45) Date of Patent: Oct. 18, 2011

(54) REFORMER

(75) Inventor: Kazuyuki Higashino, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 664 days.

(21) Appl. No.: 10/586,813

(22) PCT Filed: Jan. 24, 2005

(86) PCT No.: PCT/JP2005/000859
§ 371 (c)(1),
(2), (4) Date: Jul. 24, 2006

(87) PCT Pub. No.: WO2005/073126
PCT Pub. Date: Aug. 11, 2005

(65) Prior Publication Data
US 2008/0244973 A1 Oct. 9, 2008

(30) Foreign Application Priority Data
Jan. 30, 2004 (JP) ................................. 2004-024552

(51) Int. Cl.
*B01J 19/00* (2006.01)
*B01J 8/00* (2006.01)
(52) U.S. Cl. ........ 422/198; 422/201; 422/211; 422/222; 48/61; 48/84; 48/127.9; 48/198.7; 423/248; 96/8; 96/10
(58) Field of Classification Search .................. 422/198, 422/200; 48/61, 648.1
See application file for complete search history.

(56) References Cited

U.S. PATENT DOCUMENTS

| 5,932,181 | A * | 8/1999 | Kim et al. ..................... 422/188 |
| 2003/0044334 | A1 | 3/2003 | Kadowaki et al. |
| 2004/0065013 | A1 * | 4/2004 | DeVries ....................... 48/198.2 |
| 2005/0013754 | A1 * | 1/2005 | Kobayashi et al. ............ 422/198 |
| 2005/0188615 | A1 * | 9/2005 | Sennoun et al. ............. 48/127.9 |
| 2006/0248800 | A1 * | 11/2006 | Miglin et al. ................ 48/198.7 |

FOREIGN PATENT DOCUMENTS

| EP | 0 984 500 A2 | 3/2000 |
| EP | 1 167 282 A1 | 1/2002 |
| JP | 61 106401 | 5/1986 |
| JP | 63 011501 | 1/1988 |
| JP | 01 208303 | 8/1989 |
| JP | 02 102101 | 4/1990 |
| JP | 2001 342002 | 12/2001 |
| JP | 2002 187705 | 7/2002 |
| JP | 2003 040605 | 2/2003 |
| JP | 2003 327405 | 11/2003 |

OTHER PUBLICATIONS

U.S. Appl. No. 12/514,161, filed May 8, 2009, Higashino, et al.

* cited by examiner

*Primary Examiner* — Kaity V. Handal
(74) *Attorney, Agent, or Firm* — Oblon, Spivak, McClelland, Maier & Neustadt, L.L.P.

(57) ABSTRACT

A reformer that produces reformed gas from a hydrocarbon material includes a reforming chamber having an inner cylinder and an outer cylinder; a reforming catalyst filled in the reforming chamber; a burner that heats the reforming catalyst and fuel of reformed gas; a combustion gas outer flow channel through which combustion gas of the burner flows along an outer side surface of the reforming chamber; a combustion gas inner flow channel through which the combustion gas of the burner flows along an inner side surface of the reforming chamber; and a plurality of return pipes as a reformed gas flow channel.

6 Claims, 6 Drawing Sheets

REFORMER

TECHNICAL FIELD

The present invention relates to a reformer to be used in a fuel reforming apparatus of a fuel cell system, and particularly, it relates to a reformer which improves in thermal efficiency by reason of heating both inner and outer side surfaces of a double cylindrical reforming chamber by combustion gas produced when a burner is turned on, and in the reforming chamber, providing "return pipes" through which a produced reformed gas flows.

BACKGROUND ART

In a fuel cell system, reverse to the electrolysis of water, oxygen is electro-chemically reacted with hydrogen gas produced from hydrocarbon material in order to generate electricity and heat (warm water) during the chemical reaction.

The above fuel cell system uses oil-based fuel such as naphtha, kerosene and so on, or gas-based fuel such as city gas, etc. as the hydrocarbon material, and this hydrocarbon material is mixed with steam to produce gaseous fuel for reformed gas, and then this fuel for reformed gas is heated together with reforming catalyst, thereby hydrogen gas is produced.

Therefore, for the fuel cell system, the most important challenge is how to efficiently produce hydrogen gas from the hydrocarbon material, and various techniques have been disclosed for fuel reforming apparatuses and reformers which produce hydrogen gas.

For example, Patent document 1 discloses a technique for a fuel reforming apparatus in which a reformer and its associated devices are integrated as one unit. This fuel reforming apparatus comprises a vacuum thermally insulating chamber, and an inner space of the vacuum thermally insulating chamber is used as a flow channel of combustion gas in the reformer. The fuel reforming apparatus comprises a plurality of reforming tubes. The reforming tubes are arranged in parallel in the flow channel of the combustion gas and filled inside with reforming catalyst, and raw gas (fuel for reformed gas) flows through the reforming tubes, thereby the raw gas is reformed.

By this technique, insulation can be provided by the vacuum thermally insulating chamber without using a heat insulating material such as ceramic fibers, etc. and it is therefore possible to reduce the size of the fuel reforming apparatus and improve thermal efficiency.

Furthermore, Patent document 2 discloses a technique for a single-tube cylindrical reformer which comprises a cylindrical reforming chamber provided with a preheating layer having a filler at a front stage of reforming catalyst layer, wherein exhaust gas flows along the inner side surface of the reforming chamber to heat the reforming chamber, and hydrogen gas produced in the reforming chamber flows along a flow channel formed in the outer side surface of the reforming chamber.

By this technique, since the preheating layer is provided, a pre-heater for material becomes unnecessary, raw material can be efficiently stirred, and the amount of heat consumption can be reduced. Moreover, the inner parts of passages, etc. are helically formed with, for example, blades, and the like, thereby uniform temperature distribution can be obtained, and it is possible to set outlet temperature at predetermined temperature by improving efficiency of heat recovery.

Patent document 1: Japanese Patent Publication Laid-open No. 2003-327405 (claims 1, 2, 3 and 4, FIG. 1)
Patent document 2: Japanese Patent Publication Laid-open No. 2002-187705 (claim 1, FIG. 1)

DISCLOSURE OF THE INVENTION

However, the fuel reforming apparatus described in Patent document 1 can improve thermal efficiency by a vacuum thermally insulating chamber, but, for example, in the case of a small fuel cell system whose generated electric power is about 1 KW, further reduction in an amount of radiation heat per unit area is required to bring the thermal efficiency in a reformer to the same level.

In general, thermal efficiency decreases when the fuel reforming apparatus is reduced in size, but there has been a desire for a reformer which does not decrease the thermal efficiency, preferably, which can further improve the thermal efficiency even if it is reduced in size.

Furthermore, according to the single-tube cylindrical reformer described in Patent document 2, exhaust gas flows along the inner side surface of a reforming chamber, and hydrogen gas produced in the reforming chamber flows along a flow channel formed in the outer side surface of the reforming chamber, but thermal efficiency needs to be further increased.

In order to solve the above-mentioned problem, the present invention is directed to provide a reformer which can improve thermal efficiency even if it is reduced in size.

To achieve the above object, a reformer of the present invention which produces reformed gas from hydrocarbon material comprises: a reforming chamber having an inner cylinder and an outer cylinder; reforming catalyst filled in the reforming chamber; heat source which heats the reforming catalyst and, the hydrocarbon material supplied to the reforming chamber; combustion gas outer flow channel through which combustion gas from the heat source flows along an outer side surface of the reforming chamber; and combustion gas inner flow channel through which the combustion gas from the heat source flows along an inner side surface of the reforming chamber.

Thus, a heat transfer area per unit volume of the reforming chamber for the combustion gas can be increased, and the reformer chamber can therefore be smaller, consequently the thermal efficiency can be improved.

Furthermore, in the configuration of the reformer of the present invention, the combustion gas outer flow channel is formed of the outer cylinder and an outer shell cylinder, and the combustion gas inner flow channel is formed of the inner cylinder and an inner radiant cylinder.

Thus, it is possible to easily obtain the combustion gas inner flow channel and the combustion gas outer flow channel in a simple configuration even if the reformer is a vertical type.

Furthermore, in the configuration of the reformer of the present invention, at least part of the combustion gas inner flow channel and/or the combustion gas outer flow channel is helically formed.

Thus, the heat transfer efficiency of the combustion gas can be improved, and the thermal efficiency of the reformer can therefore be increased.

Furthermore, in the configuration of the reformer of the present invention, the helical shape of the combustion gas inner flow channel and/or the combustion gas outer flow channel allows pitch variation and/or position movement.

Thus, by adjusting a pitch interval to the reforming catalyst filled in the reforming chamber, it is possible to control heating temperature. Therefore, for example, the reforming catalyst located under the reforming chamber can be heated at optimum heating temperature, and the reforming catalyst can be effectively used wherever it is filled.

In addition, even when the catalyst has partly deteriorated due to continuous use, by adjusting the position and interval of the pitch, it is possible to heat preferentially effective catalyst which has not deteriorated.

Furthermore, in the configuration of the reformer of the present invention, a reformed gas flow channel through which the produced reformed gas flows is provided in the reforming chamber.

Thus, by effective use of high heat which the produced reformed gas has, the reforming catalyst and fuel for reformed gas can be heated, thereby it is possible to improve the thermal efficiency further.

Furthermore, in the configuration of the reformer of the present invention, a plurality of "return pipes" is used as the reformed gas flow channel.

Thus, the heat transfer area of the reformed gas flow channel becomes enlarged, and the reforming catalyst and fuel for reformed gas can be efficiently heated by the sensible heat of the reformed gas, thereby it is possible to improve the thermal efficiency further.

Furthermore, in the configuration of the reformer of the present invention, the inner cylinder and/or the outer cylinder is/are provided with bent portions and/or irregularities.

Thus, the heat transfer area for the combustion gas increases, thereby it is possible to improve the thermal efficiency further.

Furthermore, in the configuration of the reformer of the present invention, the reforming chamber, the combustion gas inner flow channel and the combustion gas outer flow channel are provided concentrically with the heat source.

Thus, the reforming catalyst filled in the reforming chamber can be heated substantially uniformly in a circumferential direction, and the reforming catalyst can therefore be effectively used.

According to the reformer in the present invention, since the combustion gas flows along both the inner and outer side surfaces of the reforming chamber, the heat transfer area of the reforming chamber for the combustion gas can become enlarged, and the thermal efficiency can be improved. Moreover, the produced reformed gas flows through the flow channel formed in the reforming chamber, such that the heat possessed by the high-temperature reformed gas can be effectively used, and the thermal efficiency can be further increased.

Furthermore, the helical shape of the combustion gas inner flow channel and/or the combustion gas outer flow channel allows pitch variation and/or position movement, such that the heating temperature can be controlled for the reforming catalyst filled in the reforming chamber, and the reforming catalyst can be effectively used wherever it is filled.

BEST MODE FOR CARRYING OUT THE INVENTION

First Embodiment

Figure 1:
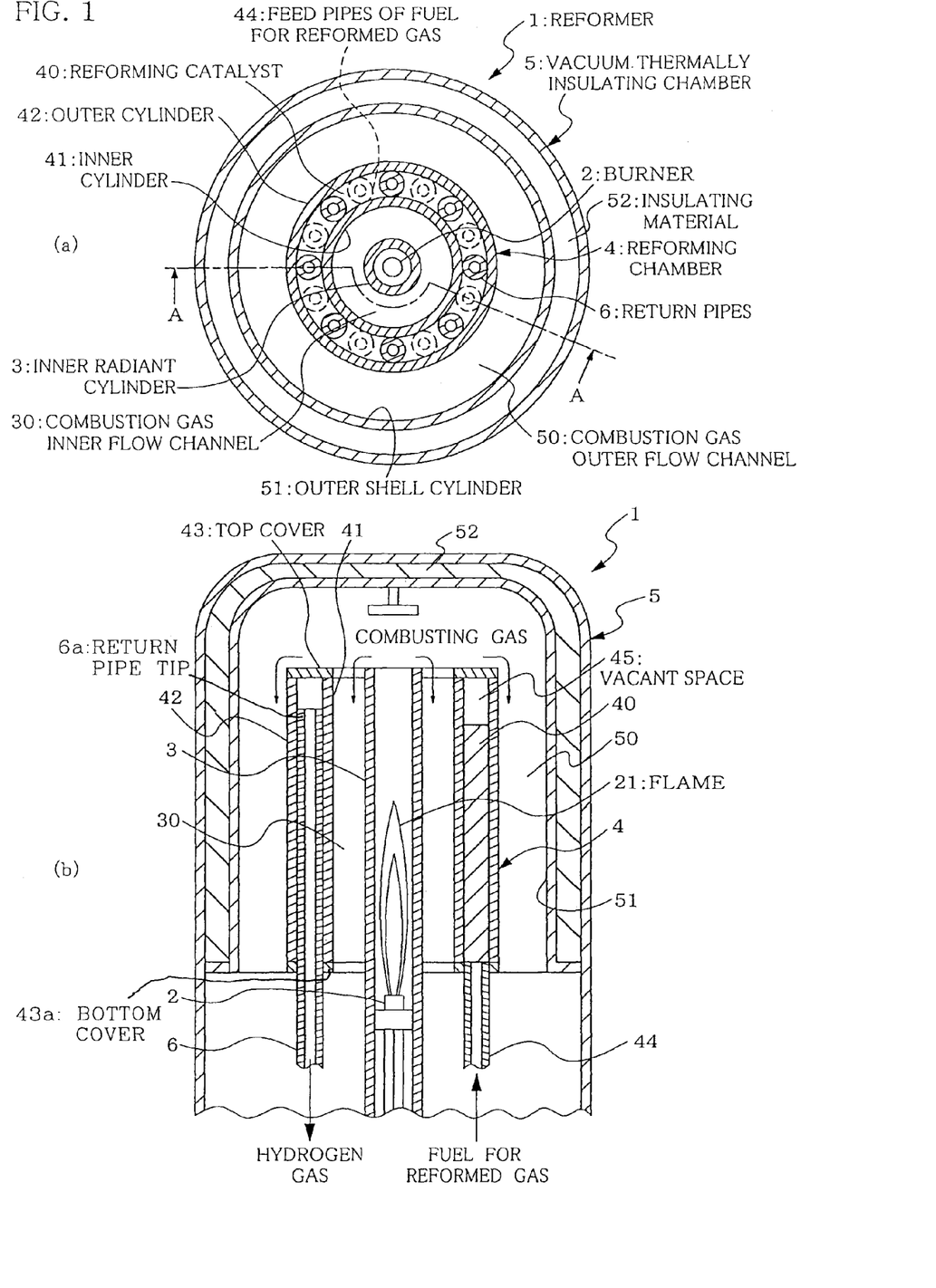
FIG. 1 is a schematic view of a reformer according to a first embodiment of the present invention, wherein (a) shows a sectional view in an upper surface direction and (b) shows a sectional view of A-A.

FIG. 1 is a schematic view of a reformer according to a first embodiment of the present invention, wherein (a) shows a sectional view in an upper surface direction and (b) shows a sectional view of A-A.

In FIG. 1, in the configuration of a reformer 1, there are provided, from the center to the outer periphery thereof, a burner 2, an inner radiant cylinder 3, a reforming chamber 4 and a vacuum thermally insulating chamber 5.

The reformer 1 in the present embodiment is installed in a fuel reforming apparatus of a fuel cell system. Although not shown in the drawings, there are provided, under the reformer 1, associated equipments necessary for the fuel reforming apparatus, for example a water evaporator, a hydrocarbon material vaporizer, and a mixing nozzle which mixes water vapor with a hydrocarbon material, and so on.

It is to be noted that the reformer 1 of the present invention is not limited to a case of being unitized as the fuel reforming apparatus, and, for example, can also be used in the fuel cell system independently from the water evaporator, etc.

The reforming chamber 4 is a cylindrical sealing chamber comprising an inner cylinder 41 and an outer cylinder 42, and is filled inside with reforming catalyst 40.

This reforming chamber 4 is a double cylinder in which the inner cylinder 41 and the outer cylinder 42 form circular cylinders, and a circular-ring-shaped top cover 43 and bottom cover 43a are welded to the cylinders.

Figure 2:
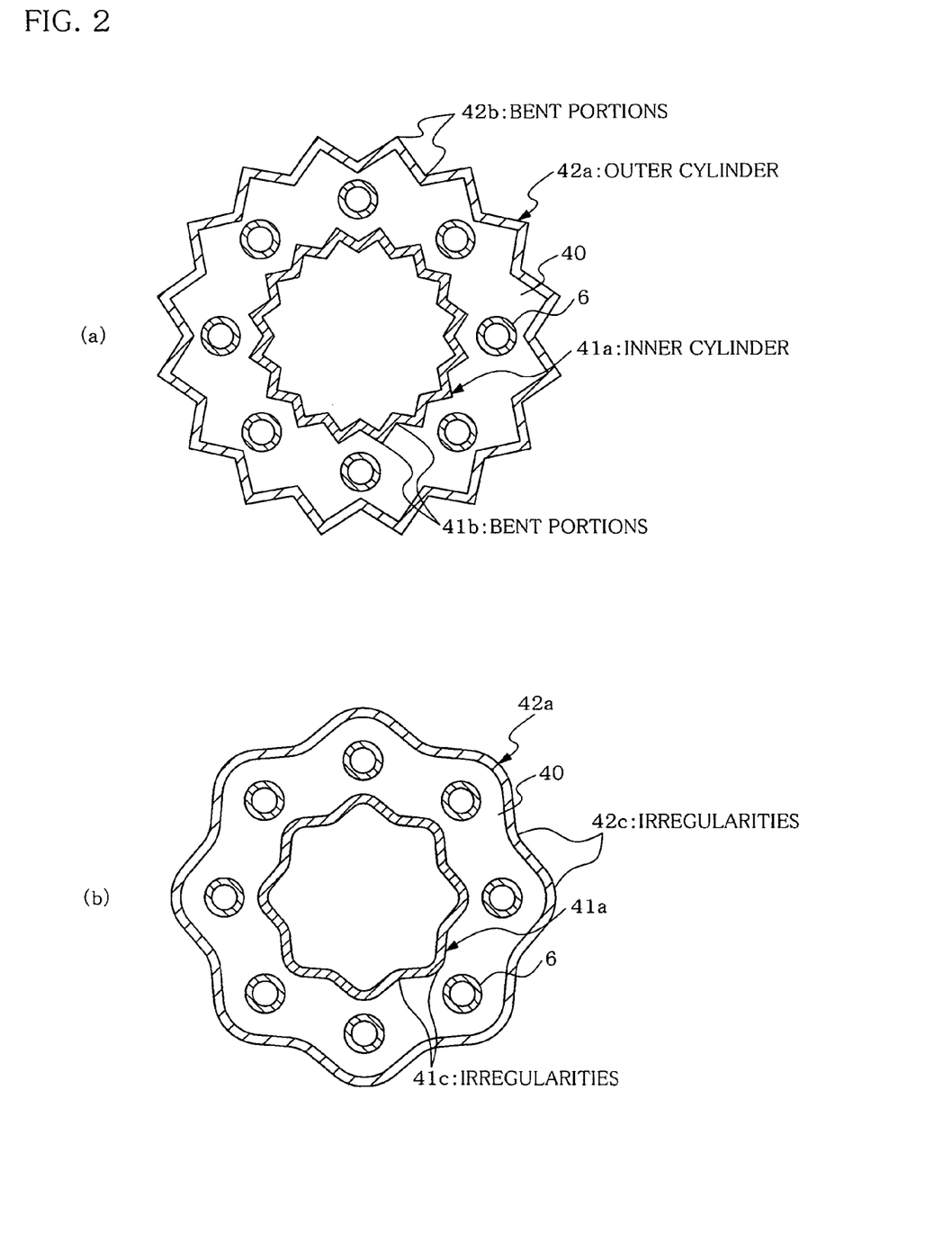
FIG. 2 is a schematic enlarged view of essential parts of a reforming chamber according to a first application, wherein (a) shows a sectional view in which bent portions are provided and (b) shows a sectional view in which irregularities are provided.

It is to be noted that the inner cylinder 41 and the outer cylinder 42 of the reforming chamber 4 are not limited to the above-mentioned shape, and for example, an inner cylinder 41a and an outer cylinder 42a are also possible in which bent portions 41b and 42b are formed to increase heat transfer area, as shown in FIG. 2(a). Moreover, instead of the bent portions 41b and 42b, a shape in which irregularities 41c and 42c are formed is also possible, as shown in FIG. 2(b). Thus, the heat transfer area for combustion gas is increased, and thermal efficiency can therefore be further increased.

Furthermore, in the reforming chamber 4, eight feed pipes 44 of fuel for reformed gas are circumferentially coupled to the bottom cover 43a at regular intervals, and the fuel for reformed gas is supplied to the reforming chamber 4 via the feed pipes 44 of fuel for reformed gas. In this manner, the feed pipes 44 of fuel for reformed gas are circumferentially provided at regular intervals, such that the fuel for reformed gas can be supplied in a substantially uniform state in the circumferential direction, and the reforming catalyst 40 in the reforming chamber 4 can react in approximately the same state in the circumferential direction.

The fuel for reformed gas supplied to the reforming chamber 4 is reformed into hydrogen gas by the reforming catalyst 40 while ascending within the reforming chamber 4.

It is to be noted that the number of feed pipes 44 of fuel for reformed gas is not limited to eight, and may be, for example, 16 or 24.

In the reforming chamber 4, eight "return pipes" 6 are provided in the spaces between the feed pipes 44 of fuel for reformed gas as hydrogen gas flow channels to recover hydrogen gas generated into an vacant space 45 in the upper part of the chamber. Moreover, the reforming chamber 4 is filled with the reforming catalyst 40 so that the vacant space 45 is formed in the upper part of the chamber, and the "return pipes" 6 are attached to penetrate the bottom cover 43a so that the tips 6a of the "return pipes" 6 protrude from the upper surface of the filled reforming catalyst 40, whereby hydrogen gas accumulated in the vacant space 45 flows down from the reforming chamber 4.

Here, by disposing the "return pipes" 6 in the spaces between the feed pipes 44 of fuel for reformed gas, the fuel for reformed gas supplied from the feed pipes 44 of fuel for reformed gas flows substantially upward, thereby it is possible to prevent inconveniences such as the occurrence of stagnation, and the reaction speed of the reforming catalyst 40 can be substantially uniform in the circumferential direction. Therefore, hydrogen gas can be stably produced until the end of the life of the reforming catalyst 40.

Moreover, by providing the "return pipes" 6 within the reforming chamber 4, the reforming catalyst 40 and the fuel for reformed gas around the "return pipes" 6 are heated when the produced high-temperature hydrogen gas flows in the "return pipes" 6, therefore it is possible to improve correspondingly the thermal efficiency.

Figure 3:
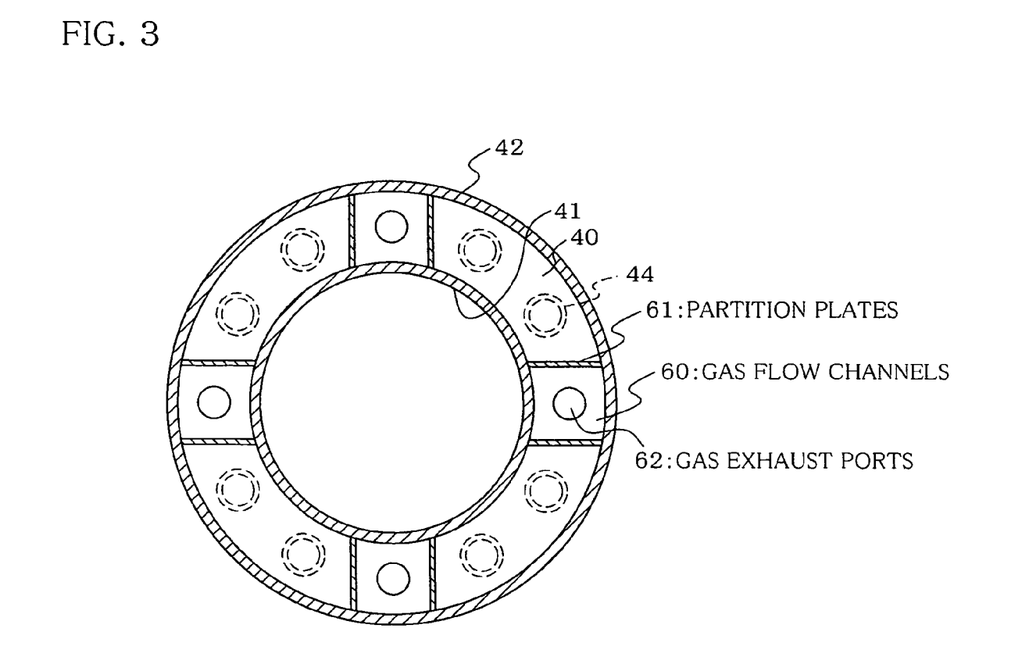
FIG. 3 shows a schematic enlarged view of essential parts of a reforming chamber according to a second application.

Furthermore, in the configuration of the present embodiment, the "return pipes" 6 are used as the hydrogen gas flow channels, but the present invention is not limited to this configuration. As shown in FIG. 3, partition plates 61 may be vertically welded between the inner cylinder 41 and the outer cylinder 42 to form four gas flow channels 60 at regular intervals in the circumferential direction.

The configuration of the gas flow channels 60 is simplified, and manufacturing costs can therefore be reduced.

It is to be noted that hydrogen gas which has passed through the gas flow channels 60 flows out of gas exhaust ports 62 to gas exhaust pipes (not shown).

In the reformer 1, the burner 2 is provided under the center of the reforming chamber 4, and the inner radiant cylinder 3 having about the same height as that of the reforming chamber 4 is provided between the burner 2 and the reforming chamber 4 so that the reforming chamber 4 is not directly subjected to a flame 21 from the burner 2. Combustion gas inner flow channel 30 is formed between the inner radiant cylinder 3 and the reforming chamber 4, and part of the combustion gas blown upward by the burner 2 flows downward through the combustion gas inner flow channel 30, and then contacts the inner side surface of the reforming chamber 4, and heats the reforming chamber 4.

Furthermore, combustion gas outer flow channel 50 is formed between an outer shell cylinder 51 and the outer cylinder 42 of the reforming chamber 4, and the remainder of the combustion gas blown upward by the burner 2 flows downward through the combustion gas outer flow channel 50. At this moment, the combustion gas contacts the outer side surface of the reforming chamber 4, and heats the reforming chamber 4.

It is to be noted that the vacuum thermally insulating chamber 5 and an insulating material 52 provided inside the vacuum thermally insulating chamber 5 are used as insulating means in the present embodiment. Moreover, an inner side plate of the outer shell cylinder 51 accommodating the insulating material 52 can also be used to radiate heat inward.

Here, the reforming chamber 4, the combustion gas inner flow channel 30 and the combustion gas outer flow channel 50 are preferably provided concentrically with the burner 2, and this makes it possible to heat the reforming catalyst 40 filled in the reforming chamber 4 substantially uniformly in the circumferential direction, and use effectively the reforming catalyst 40. Moreover, because reaction conditions can be about the same in the circumferential direction, it is possible to prevent such a problem that the concentration of produced hydrogen gas varies in the circumferential direction.

It is to be noted that the burner 2 is configured to spurt out single flame 21, but the present invention is not limited to this type of burner, and, for example, a burner whose flames spurt in a circular-ring shape may be used.

Next, the operation of the reformer 1 having the configuration described above will be described.

In the reformer 1, when the burner 2 is first turned on, the combustion gas which has ascended through the inner radiant cylinder 3 flows in the combustion gas inner flow channel 30 and the combustion gas outer flow channel 50, and heats the reforming chamber 4 from both the inner and outer side surfaces of the reforming chamber 4. Then, when the reforming chamber 4, etc. are heated to predetermined temperature, the fuel for reformed gas whose temperature has risen to about 500° C. is supplied from the feed pipes 44 of fuel for reformed gas.

The supplied fuel for reformed gas is heated while ascending within the reforming chamber 4, and causes a chemical reaction due to the reforming catalyst 40. Then, it is reformed into hydrogen gas when it reaches the upper part of the reforming chamber 4, and heated to become high-temperature gas of about 700° C.

The hydrogen gas produced as described above flows down from the reforming chamber 4 via the "return pipes" 6. Then, the high-temperature hydrogen gas of about 700° C. heats the fuel for reformed gas and the reforming catalyst 40 via the "return pipes" 6 when passing through the "return pipes" 6.

Thus, in the reformer 1 of the present embodiment, because the reforming chamber 4 is heated from both the inside and outside, the heat transfer area becomes enlarged and it is possible to improve the thermal efficiency.

Furthermore, since the produced high-temperature hydrogen gas flows in the "return pipes" 6 disposed inside the reforming chamber 4, the fuel for reformed gas and the reforming catalyst 40 can be heated, thereby it is possible to improve the thermal efficiency further.

Second Embodiment

Figure 4:
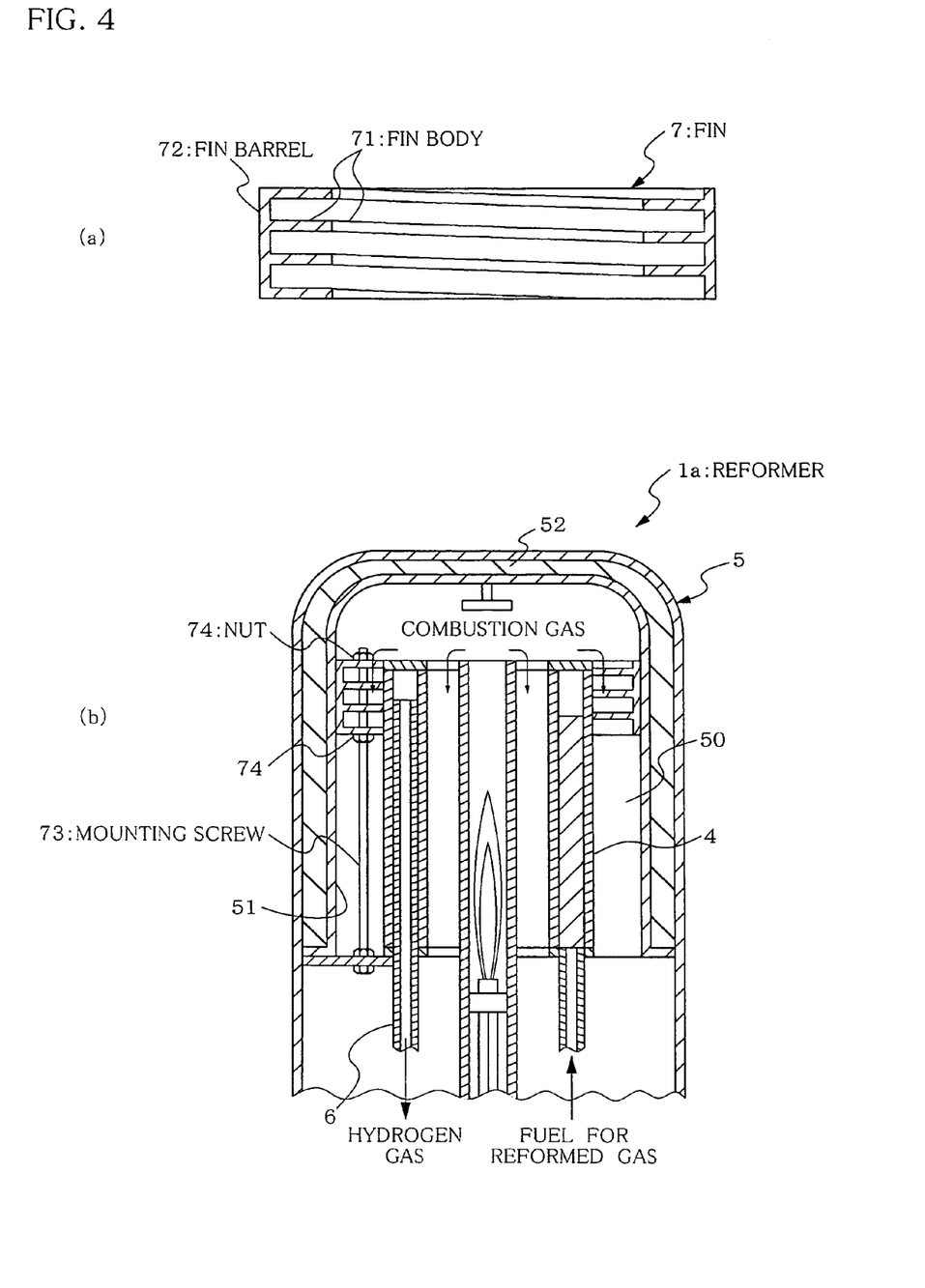
FIG. 4 is a schematic view of an external fin of a reformer according to a second embodiment of the present invention, wherein (a) shows an enlarged sectional view and (b) shows a sectional view in which the external fin is attached.

FIG. 4 is a schematic view of an external fin of a reformer according to a second embodiment of the present invention, wherein (a) shows an enlarged sectional view and (b) shows a sectional view in which the external fin is attached.

In FIG. 4, a reformer 1a has a configuration in which a fin 7 is provided in combustion gas outer flow channel 50.

The fin 7 comprises a fin barrel 72 to be inserted into an outer shell cylinder 51, and a fin body 71 helically provided in a protruding manner in the inner side of the fin barrel 72. Combustion gas contacts the fin 7 and the flowing direction thereof is changed, such that the heat transfer efficiency to a reforming chamber 4 can be enhanced.

In this fin 7, a through-hole is bored in the fin body 71, and a mounting screw 73 comprising a complete thread is inserted into this through-hole and fixed at an optional height position.

It is to be noted that configuration of other parts is substantially similar to that in the reformer 1 described above.

The reformer 1a having the configuration described above allows the height position of the fin 7 to be freely adjusted with respect to the reforming chamber 4, so that the temperature of the reforming chamber 4 in a height direction can be adjusted. That is, because a chemical reaction of reforming catalyst 40 in the reforming chamber 4 is efficiently induced in a temperature range of about 550 to 650° C., the provision of the fin 7 makes it possible to force the temperature of the reforming catalyst 40 in a vertical direction to be adjusted.

Thus, for example, when the reforming catalyst 40 for about ten years is filled in the reforming chamber 4, the temperature of the reforming catalyst 40 under the reforming chamber 4 is relatively low, so that it is assumed that sufficient performance cannot be exerted. However, by adjusting the height of the fin 7, a chemical reaction can be caused at optimum temperature for the reforming catalyst 40 which extends from the upper part to lower part of the reforming chamber 4, and thereby it is possible to produce efficiently and stably hydrogen gas and use effectively the reforming catalyst 40.

It is to be noted that the fin 7 is provided in the combustion gas outer flow channel 50 in the present embodiment, but a fin having a substantially similar configuration can also be provided in the combustion gas inner flow channel 30.

Figure 5:
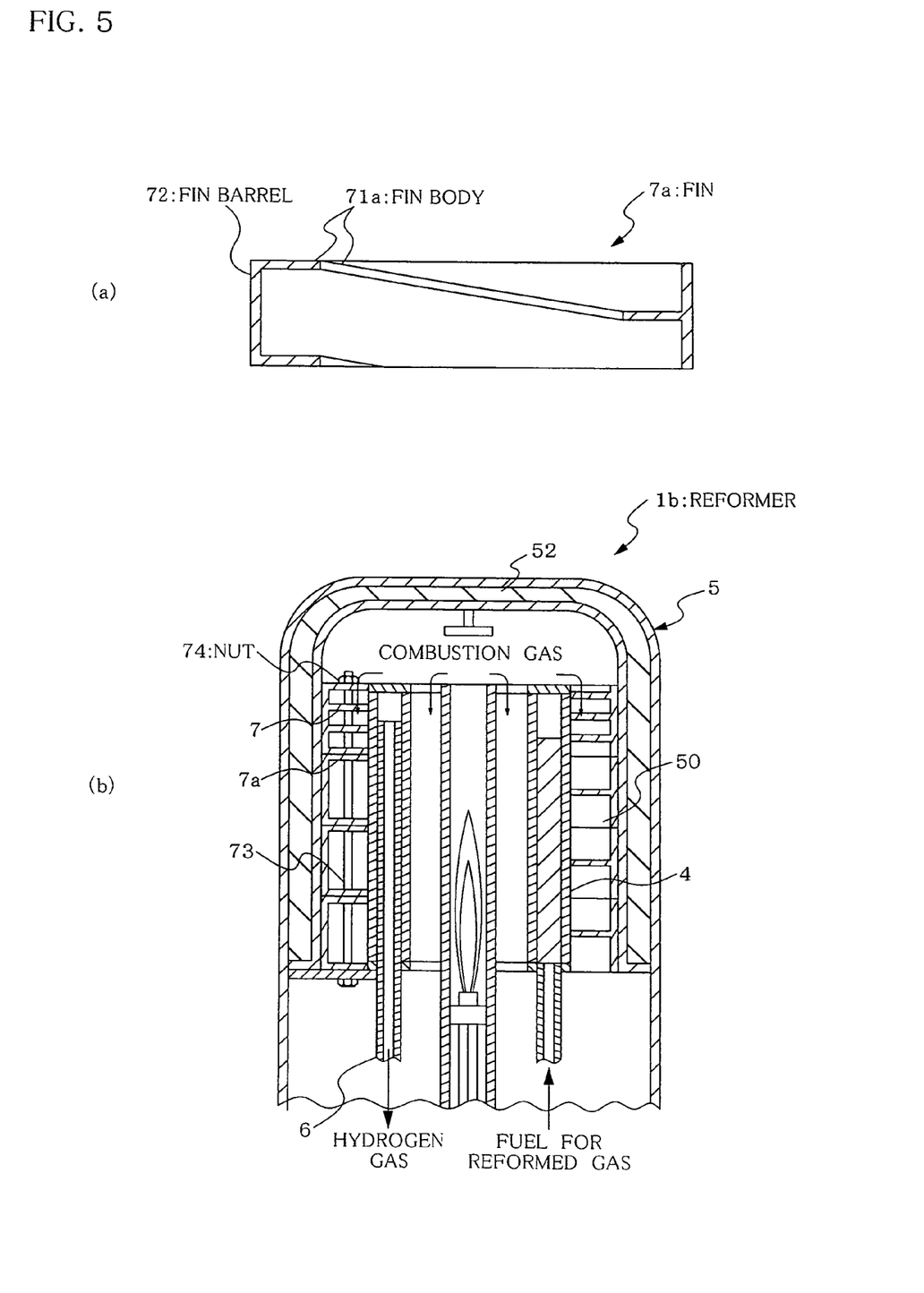
FIG. 5 is a schematic view of an external fin of a reformer according to a third application, wherein (a) shows an enlarged sectional view and (b) shows a sectional view in which the external fin is attached.

Furthermore, the fin 7 is provided in the part of the combustion gas outer flow channel 50 in the configuration of the present embodiment, but the present invention is not limited to this configuration. For example, as shown in FIG. 5, a configuration in which a fin 7a of a different pitch is stacked is also possible. Thus, heat transfer efficiency is entirely improved.

Moreover, when the fin 7 of a small pitch is stacked on an upper stage, the reforming catalyst 40 in the upper part of the reforming chamber 4 can be mainly used. Further, although not shown in the drawings, when the fin 7 is stacked on a lower stage, the reforming catalyst 40 in the lower part of the reforming chamber 4 can be mainly used. That is, by changing the order of stacking the fin 7, 7a, for example, during periodic maintenance, the pitch of the fin (helically shaped) can be changed. Thus, the reforming catalyst 40 can be heated to the optimum temperature regardless of the height position, and the entire reforming catalyst 40 can be effectively used.

While the former of the present invention has been described above showing the preferred embodiment, the former according to the present invention is not exclusively limited to the embodiments described above, and it should be understood that various modifications can be made within the scope of the present invention.

For example, the inner cylinder 41 and the outer cylinder 42 of the reformer 1 may be formed in bellows-like form in which the bent portions are axially provided. This also makes it possible to increase in the heat transfer area for the combustion gas and improve the thermal efficiency.

Figure 6:
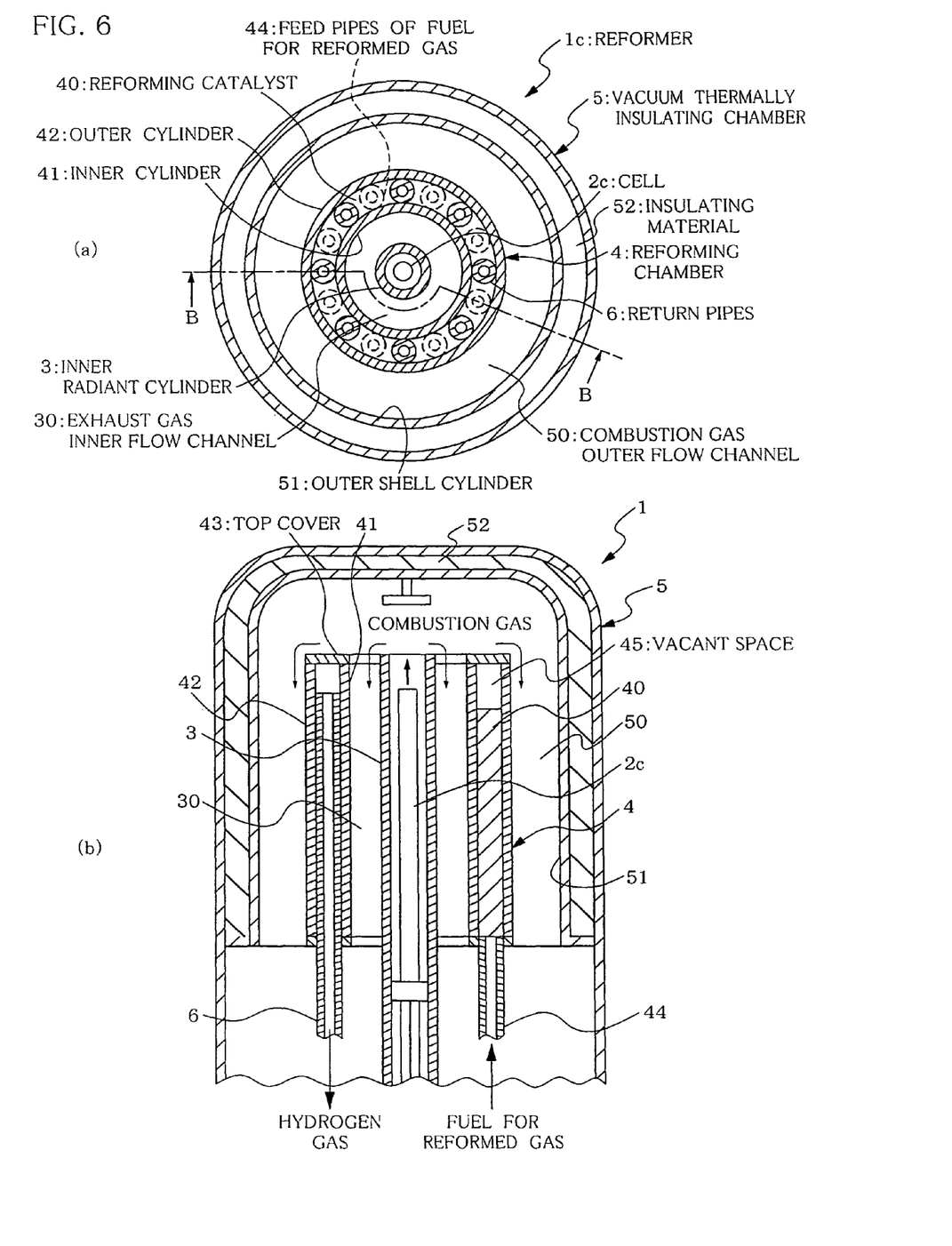
FIG. 6 is a schematic view of a reformer according to a third embodiment of the present invention, wherein (a) shows a sectional view in an upper surface direction and (b) shows a sectional view of B-B.

Furthermore, in a solid oxide fuel cell system (SOFC), in addition to heat generated during electric power generation, excessive hydrogen is generally burnt at the exit of the cell, thereby high-temperature combustion gas is generated. In this case, as shown in FIG. 6, a cell 2c of the SOFC may be used as heat source instead of the burner. In this manner, a reformer 1c uses the high-temperature combustion gas exhausted from the cell 2c, thereby allowing simpler structure, reduction in manufacturing costs, and improvement in overall energy efficiency.

It is to be noted that the number of cells 2c is one, or two or more. Therefore, the cell 2c includes a stack, bundle, etc. of a collection of cells. Moreover, high-temperature steam, etc. exhausted from the cell 2c functions as the combustion gas from the heat source.

INDUSTRIAL APPLICABILITY

A reformer of the present invention is not limited to a case where reforming catalyst is used as catalyst and fuel of reformed gas is used as reaction gas. For example, the present invention can also be applied to a chemical reactor which uses catalyst at predetermined temperature to cause a chemical reaction.

The invention claimed is:

1. A reformer which produces reformed gas from a hydrocarbon material, the reformer comprising:
    a reforming chamber having an inner cylinder, an outer cylinder, and annular top cover and an annular bottom cover, the top and bottom covers each being attached to the inner and outer cylinders;
    reforming catalyst filled between the outer cylinder, the inner cylinder, the top cover and the bottom cover of the reforming chamber such that a vacant space is formed in an upper part of the reforming chamber;
    a plurality of fuel gas feed pipes connected to the bottom cover;
    a plurality of return pipes respectively arranged between the fuel gas feed pipes of the plurality of fuel gas feed pipes connected to the bottom cover, the plurality of return pipes penetrating the bottom cover and the reforming catalyst and having tips arranged between the outer cylinder and the inner cylinder, such that said tips protrude from an upper surface of the reforming catalyst;
    a heat source which heats the reforming catalyst and the hydrocarbon material supplied to the reforming chamber;
    combustion gas inner flow channel through which a part of the combustion gas from the heat source flows along an inner side surface of the inner cylinder of the reforming chamber; and combustion gas outer flow channel through which the remaining part of the combustion gas from the heat source flows along an outer side surface of the reforming chamber.

2. The reformer according to claim 1, wherein the combustion gas outer flow channel is formed of the outer cylinder and an outer shell cylinder, and the combustion gas inner flow channel is formed of the inner cylinder and an inner radiant cylinder.

3. The reformer according to claim 1 wherein at least a part of the combustion gas inner flow channel and/or the combustion gas outer flow channel is helically formed.

4. The reformer according to claim 3, wherein a fin having a fin body helically provided in a protruding manner is fixed in the combustion gas inner flow channel and/or the combustion gas outer flow channel such that the height of such positioning can be adjusted or a fin of a different pitch can be stacked such that the helical shape of the combustion gas inner flow channel and/or the combustion gas outer flow channel allows pitch variation and/or position movement.

5. The reformer according to claim 1, wherein the inner cylinder and/or the outer cylinder is/are provided with bent portions and/or irregularities.

6. The reformer according to claim 1, wherein the reforming chamber, the combustion gas inner flow channel and the combustion gas outer flow channel are provided concentrically with the heat source.

\* \* \* \* \*